United States Patent
Gara et al.

(10) Patent No.: US 7,350,027 B2
(45) Date of Patent: Mar. 25, 2008

(54) ARCHITECTURAL SUPPORT FOR THREAD LEVEL SPECULATIVE EXECUTION

(75) Inventors: Alan G. Gara, Mount Kisco, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 11/351,829

(22) Filed: Feb. 10, 2006

(65) Prior Publication Data

US 2007/0192540 A1  Aug. 16, 2007

(51) Int. Cl.
*G06F 12/02* (2006.01)
(52) U.S. Cl. .................................. 711/121
(58) Field of Classification Search ......... 711/121, 711/120; 712/216
See application file for complete search history.

(56) References Cited

U.S. PATENT DOCUMENTS

| | | | | |
|---|---|---|---|---|
| 6,564,302 | B1 * | 5/2003 | Yagi et al. | 711/144 |
| 6,950,908 | B2 * | 9/2005 | Shibayama et al. | 711/144 |
| 2003/0018684 | A1 * | 1/2003 | Ohsawa et al. | 709/102 |
| 2004/0059891 | A1 * | 3/2004 | Luick | 712/206 |
| 2006/0294326 | A1 * | 12/2006 | Jacobson et al. | 711/156 |

OTHER PUBLICATIONS

Sohi et al., "Speculative Multithreaded Processors", Apr. 2001, IEEE, pp. 66-73.*
Tsai et al., "The Superthreaded Processor Architecture", Sep. 1999, IEEE Transactions on Computers, vol. 49 No. 9, pp. 881-902.*
Ceze et al., "Bulk Disambiguation of Speculative Threads in Multiprocessors", 2006, Proceedings of the 33rd International Symposium on Computer Architecture.*
Fung et al., "Improving Cache Locality for Thread-Level Speculation", 2006, IEEE.*

* cited by examiner

*Primary Examiner*—Kevin L. Ellis
(74) *Attorney, Agent, or Firm*—Scully, Scott, Murphy & Presser, P.C.; Daniel P. Morris, Esq

(57) ABSTRACT

A method and apparatus for hardware support of the thread level speculation for existing processor cores without having to change the existing processor core, processor core's interface, or existing caches on the L1, L2 or L3 level. Architecture support for thread speculative execution by adding a new cache level for storing speculative values and a dedicated bus for forwarding speculative values and control. The cache level is hierarchically positioned between the cache levels L1 and L2 cache levels.

35 Claims, 8 Drawing Sheets

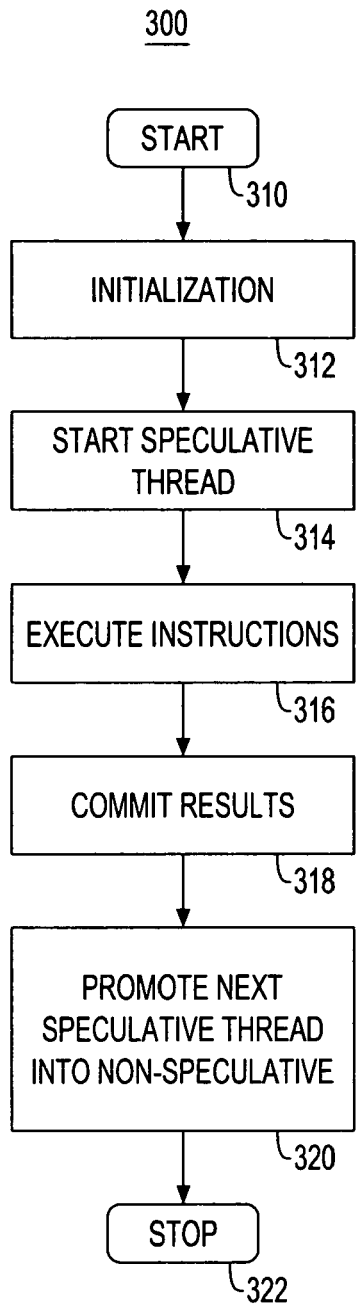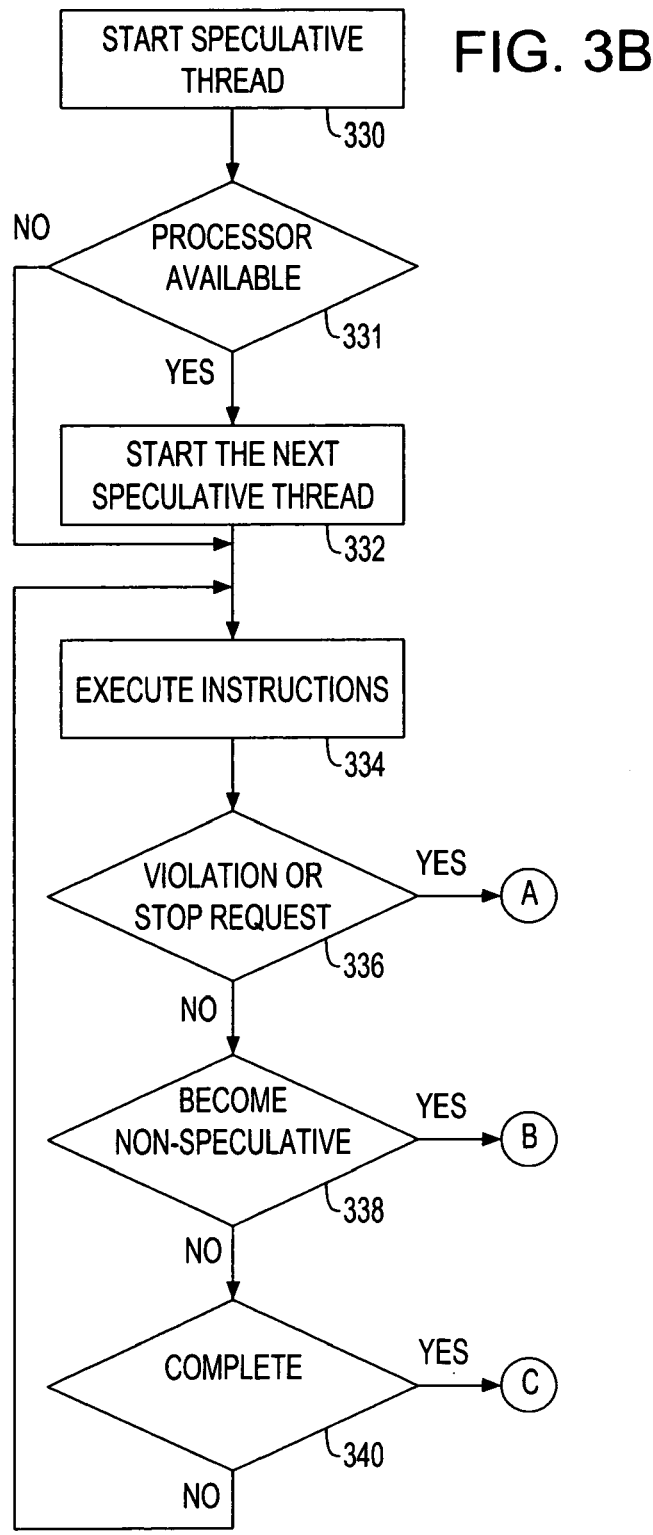
FIG. 3A
FIG. 3B

ARCHITECTURAL SUPPORT FOR THREAD LEVEL SPECULATIVE EXECUTION

BACKGROUND OF THE INVENTION

1. Field of the Invention

The present invention generally relates to microprocessor and multiprocessor architectures and, more particularly, to thread-level speculative processor execution for achieving high performance and speeding up sequential applications.

2. Description of the Prior Art

As increasing numbers of smaller and faster transistors can be integrated on a single chip, new processors are designed to use these transistors effectively to increase performance. The arising challenge is to find the most effective way to put these transistors in use. Currently, most computer designers opt to use increasing transistor budget to build even bigger and more complex uniprocessors. Another possibility is to place big amounts of memory on the chip. Alternatively, multiple processor cores can be placed on a single chip. The later approach is called chip multiprocessors (CMP).

Performance improvements using a single complex processor is achieved by exploiting ILP (instruction level parallelism), i.e. by finding non-dependent instructions in a program sequence which are then executed at the same time. However, the possible performance gain by exploiting IPL is limited due to finite amount of ILP present in any particular application sequence.

Placing multiple smaller processor cores on a single chip is attractive because single processor core is less complex to design and verify. This results in less costly and complex verification process as once verified module-processor—is repeated multiple times on a chip. Each processor core on a multiprocessor is much smaller than a competitive uniprocessor, minimizing the core design time. In addition, keeping design partitions small—like a single processor core in a CMP—design tools can handle processor complexity much easier, compared to competitive complex uniprocessors. However, many important existing applications are written for uniprocessors, and it is a non-trivial task to convert uniprocessor applications into multiprocessor ones. For this, sequential programs have to be explicitly broken into threads and synchronized properly. So far, parallelizing compilers have been only partly successful at automatically handling these tasks.

Speculative multithreaded processors present possible solution of these difficulties offering high potential performance improvement. A speculative multithreaded processor consists logically of replicated processor cores that cooperatively perform the parallel execution of a sequential program. The sequential program is divided into chunks called speculative threads, and these threads are executed on processor cores concurrently and speculatively. This approach for performance improvement by exploiting coarse-grain parallelism in addition or instead of fine-grain parallelism (e.g., ILP) is called thread level speculation (TLS). In thread level speculation approach, sequential programs are divided into speculative threads which are then executed concurrently on processor cores. Ideally, there are no data and/or control dependences between the threads, but being parts of the same sequential program, speculative threads are both data and control dependant. The data flow between speculative threads in one direction only—from sequentially older threads to younger ones. (Thus, data used in a younger speculative thread can be a result calculated in an older thread.) To ensure that each program executes the same way that it did on a uniprocessor, hardware must track all inherited dependences. When a younger thread in a sequence causes a true dependence violation, the hardware must ensure that the misspeculation is detected, and the misspeculated thread has to re-execute with the correct data.

To support speculation, multiprocessor architecture for thread level speculation has to fulfill the following requirements: 1) it has to maintain a notion of the relative order of the threads—i.e., know which thread is executed before some other thread in a sequential program; 2) it has to forward data between parallel threads, or predict data; 3) it has to support mechanism for dependency violation detection—to detect if read occurred too early; 4) it has to safely discard speculative thread once dependency violation is detected; 5) it has to commit speculative writes in proper order—only after making sure that this thread would have been executed the same in a sequential execution; and, 6) it has to re-execute the misspeculated threads with proper data.

A number of multiprocessor architectures with support for thread level speculation have been proposed. In several of these architectures, a program is chopped into threads by the compiler during the compilation time, such as in a multiscalar processor as proposed in the reference to G. S. Sohi, et al. entitled "Multiscalar Processors", $27^{th}$ International Symposium on Computer Architecture (ISCA-22), 1995, or as in a superthreaded architecture or trace processor. In other approaches, hardware dynamically forms the threads during the run time, such as proposed in the reference entitled "Dynamic Multithreaded Processor" by H. Akkary and M. Driscoll in Proc. Of the $31^{st}$ Annual International Symposium on Microarchitecture (1998) and "Clustered Speculative Multithreaded Processor" proposed by P. Marcuello and A. Gonzales in Proc. Of the 13th Intl. Conference on Supercomputing, pp. 365-372 (1999). All of these architectures require significant changes on the processor core or/and on the L1 and/or L2 level caches to support thread level speculation. These changes include at least one of the following: 1) provision of means for registers forwarding between processors; 2) the addition of new fields in one or more caches to distinguish speculative vs. non-speculative values; 3) a modified processor interface to allow communication of speculative values; and 4) a change of speculation status for the processor. Requiring significant changes to the processor core and/or to the memory nest to enable thread level speculation, existing architectures can not take advantage of increased performance which TLS offers. To support thread level speculation on the existing processor, the processor core needs massive re-design and complete re-verification process. Similarly for the memory nest, re-design and verification effort makes it prohibitive, or at least very expensive, for already existing cores and system.

It would be highly desirable to provide a system and method which would enable thread level speculative execution on existing processors and memory systems without requiring costly changes to the processor core or existing cache hierarchy.

SUMMARY OF THE INVENTION

This invention addresses directly a method and apparatus for hardware support of the thread level speculation for existing processor cores without having to change the existing processor core, processor core's interface, or existing caches on the L1, L2 or L3 level. The invention discloses novel architecture support for thread speculative execution by adding a new cache level for storing speculative values and a dedicated bus for forwarding speculative values and control. The cache level is hierarchically positioned between the cache levels L1 and L2 cache levels, and thus is hereinafter referred to as cache L1.5.

The method and apparatus enables a multiprocessor chip for each processor core to select operation in one of the following two modes: 1) a Symmetric Multi-Processor (SMP)—with no thread level speculation support enabled, and 2) a Chip Multi-Processor (CMP) with thread level speculation (TLS) enabled. A means enabling simple switching between two modes of operation, is additionally provided.

In the existing designs, processor core and memory nest are often already verified, so introducing new functionality into the processor core or, one of the caches to support thread level speculative execution requires repetition of the verification process for these components, which is costly and time-consuming process. However, according to the invention, the need to redesign the existing processor cores and memory subsystems is eliminated by provision of the new cache level situated between the L1 and L2 caches. To each processor core, there is associated a new cache level, labeled L1.5. The L1.5 cache is private and local to each processor, and is intended to store speculative results and status associated with that processor.

Thus, according to a first aspect of the invention, there is provided an apparatus for supporting thread level speculative execution in a computing environment having multiple processing units adapted for concurrent execution of threads in speculative and non-speculative modes, each processing unit having first and second level caches operatively connected therewith for enabling multiprocessing, the apparatus comprising:

an additional cache level local at each the processing unit for use only in a thread level speculation mode, each the additional cache for storing speculative results and status associated with its associated processor when handling speculative threads;

means for interconnecting each the additional cache level for forwarding speculative values and control data between parallel executing threads; and means for bypassing the additional cache level when no speculation processing thread is enabled at an associated processing unit.

A second aspect of the invention is directed to a method for supporting thread level speculative execution in a computing environment having multiple processing units adapted for concurrent execution of threads in speculative and non-speculative modes, each processing unit having first and second level caches operatively connected therewith for enabling multiprocessing, the method comprising providing an additional local cache level at each said processing unit for use only in a thread level speculation mode, each said additional cache for storing speculative results and status associated with its associated processor when handling speculative threads.

BRIEF DESCRIPTION OF THE DRAWINGS

The objects, features and advantages of the present invention will become apparent to one skilled in the art, in view of the following detailed description taken in combination with the attached drawings, in which:

FIGS. 3(a)-3(d) illustrate a flow chart depicting the flow control for starting, executing, status changing and stopping of the threads in the embodiment of the invention depicted in FIG. 2;

DETAILED DESCRIPTION OF THE PREFERRED EMBODIMENTS

Figure 1:
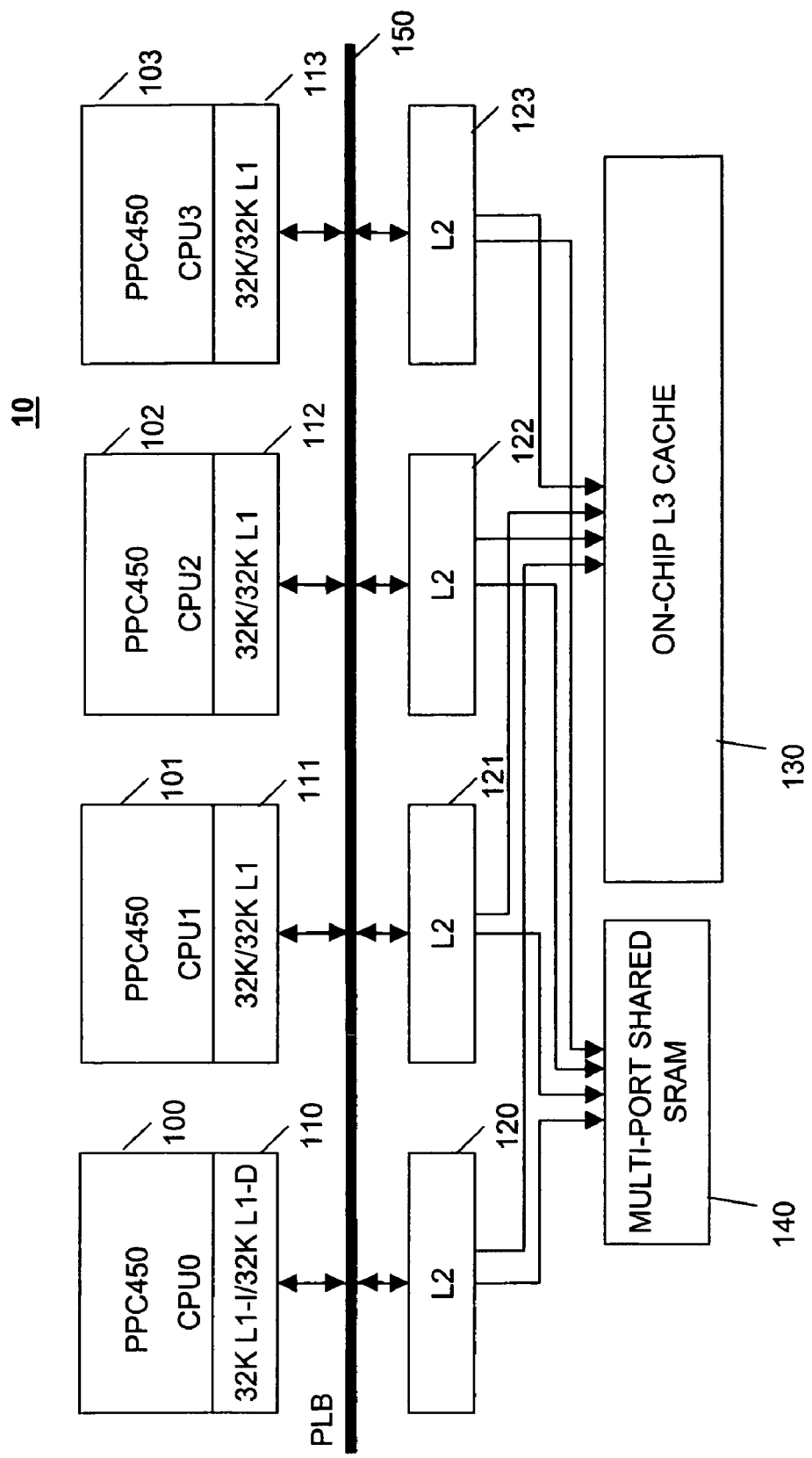
FIG. 1 is a circuit block diagram depicting a base multi-processor architecture without the support for thread level speculation.

With reference to the accompanying drawings, FIG. 1 illustrates a schematic diagram of the overall base architecture of the multiprocessor system 10 without the support for the thread level speculation. The system is composed of four identical processor cores labeled CPU0 to CPU3, labeled 100-103, respectively, each with associated local L1 level data and instruction caches, labeled 110-113, respectively, and their associated L2 caches 120-123, respectively. The system's L3 cache 130 is shared and can be implemented on-chip or off-chip. In the preferred embodiment, the processor cores 100-103 are PowerPC cores such as PPC440 or PPC405, but any other processor core can be used without departing from the scope of this invention. The processor cores 100-103 are interconnected by a processor local bus 150. In addition, the architecture features also a shared multi-ported SRAM 140.

Figure 2:
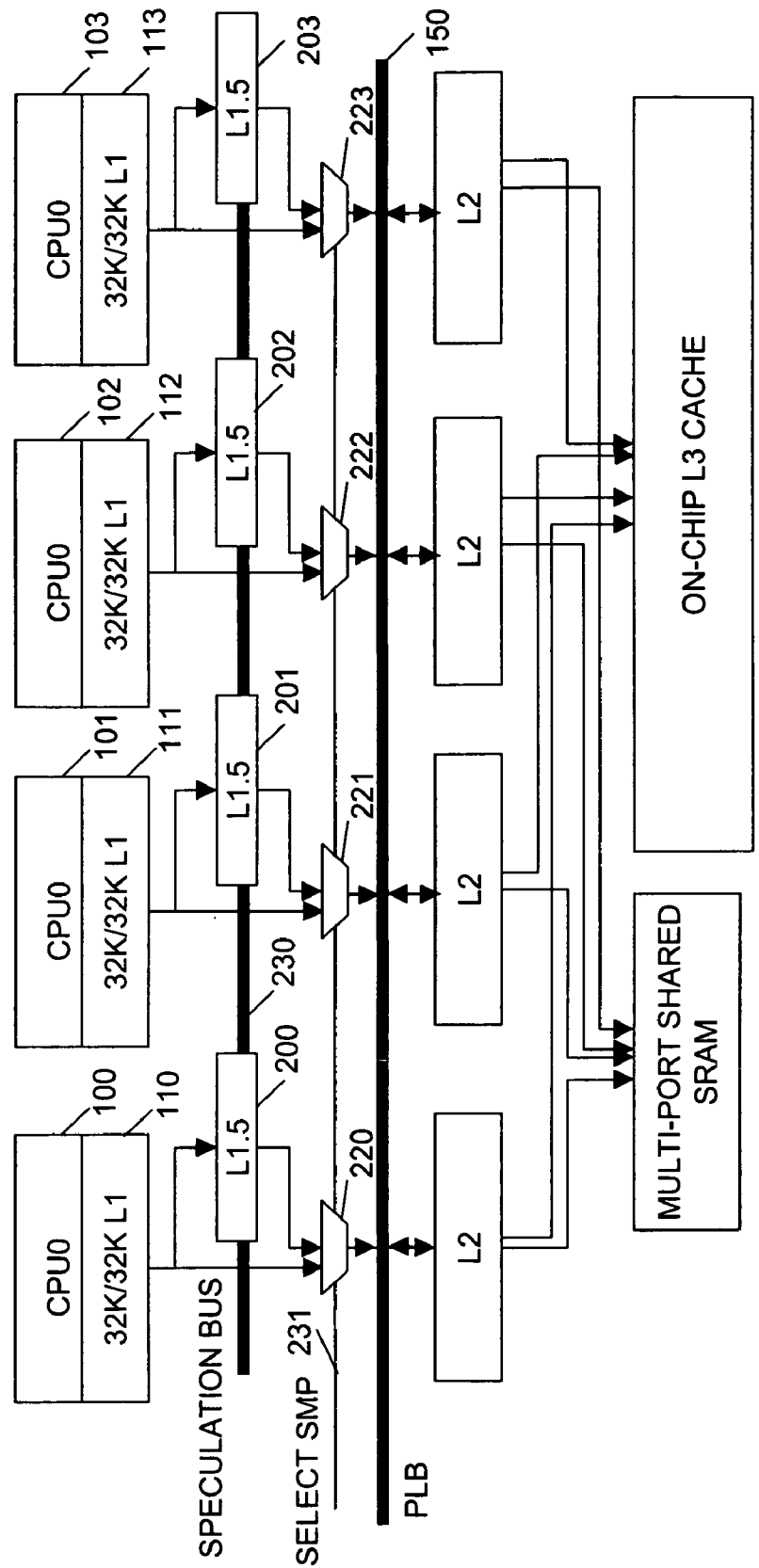
FIG. 2 is a circuit block diagram depicting a preferred embodiment of the invention with the added support for speculation.

FIG. 2 shows the addition of the new cache level L1.5 between the data caches L1 and L2 levels to enable thread level speculation. That is, to each of the four processor cores 100-103 there is added a new cache level L1.5 200-203, respectively. The L1.5 cache is private and local to each processor, and is intended to store speculative results and status associated with that processor. This effectively implements memory renaming. The L1.5 cache is used only in the thread level speculation CMP mode with data being fed directly to and from L1.5 caches 200-203. For the speculation mode, the L1 cache coherency is replaced by coherency in L1.5 cache. In the symmetric multiprocessing mode (i.e., mode where no speculation is enabled) this L1.5 cache is bypassed. The bypassing for each processor 100-103 is achieved by selecting multiplexers 220-223 respectively, using SMP select signal 231, to completely bypass the L1.5 cache in the SMP mode. All four L1.5 caches 200-203 are interconnected by a dedicated bus 230 to enable data forwarding between parallel threads, to detect true dependency violation, and to implement cache coherency. Other embodiments may implement a crossbar switch device to interconnect the local L1.5 speculative caches in the system or some other interconnect means, without departing from the scope of the invention.

During operation in the thread level speculation (TLS) mode, processors 100-103 use both L1 110-113 and L1.5 200-203 caches. In this operation mode, the L1 cache is configured to be in write-through mode and the L1.5 cache in write-back mode. The L1.5 cache keeps all speculative data, and only after the thread becomes non-speculative, data from the L1.5 cache are committed to lower level caches. Thus, L2 cache and below contain always and only non-speculative data. Threads are assigned to processors in a manner as known in the art and apparent to skilled artisans, so that each processor knows if it is the non-speculative thread, and which processors run more and less speculative threads. For example, one possible implementation for achieving this is round-robin assignment of threads to processors, but other allocations are possible without departing from the scope of this invention.

In the TLS mode, the L1 cache is in write-through mode, thus all writes by the processor are forwarded to the L1.5 cache as well. The cache line is written in the processor's L1.5 cache, and a "modified" bit in a L1.5 cache register is set for that cache line. These data do not get committed to the L2 and lower hierarchical memory level until the thread gets promoted into the non-speculative thread.

Figure 3C:
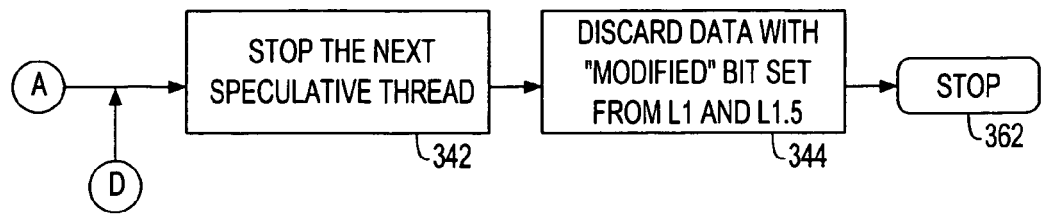

FIGS. 3(a)-3(d) illustrate a flow chart depicting the flow control 300 for starting, executing, status changing and stopping of the threads in the embodiment of the invention depicted in FIG. 2. As shown, the flow control 300 depicts how a first thread from a sequential program is started, executed, stopped, and how its status is changed. As shown in FIG. 3(a), the very first thread is always non-speculative. After the thread is started as indicated at step 310, an initialization routine is performed at step 312 such as register or memory arrays initialization, and the first speculative thread is started at step 314. After the speculative thread is started, the non-speculative thread continues executing instructions, as indicated at step 316, and after committing data at step 318, it promotes the next speculative thread (that is, the same thread it started in the step 314) into a non-speculative thread as indicated at step 320. Finally, it stops its execution at step 322.

FIG. 3(b) illustrates the flow control of all subsequent threads, which all start as speculative threads as indicated at step 330. Once a speculative thread is started, a determination is made at step 331 as to whether there is an available processor. If there is an available processor, the process continues to step 332 where the next, more speculative thread is started, and the process continues with executing instructions as indicated at step 334. Otherwise, if it is determined at step 331 that no processor is available, then the process proceeds directly to step 334 where instructions are executed.

Continuing to step 336, a determination is made as to whether there is a dependency violation or stop request. If no dependency violation or stop request is detected at step 336, then the process proceeds to step 338 where a determination is made as to whether the thread has become non-speculative. Otherwise, if a dependency violation or stop request is detected at step 336, then the process proceeds to step 342 as will be described herein with respect to FIG. 3(c). Proceeding to step 338, if it is determined that the thread has become non-speculative, then the process proceeds to step 348 as will be described herein with respect to FIG. 3(d). Otherwise, if no dependency violation or stop request is detected at step 336, and the thread has not become non-speculative, the process proceeds to step 340 and a determination is made as to whether the all instructions have been completed. If all instructions have not been completed as determined at step 340, then the process continues executing instructions by returning to the process flow beginning at step 334. Otherwise, if the thread has made a determination that all instructions have been executed, then the process proceeds to step 350 as will be described herein with respect to FIG. 3(d).

Returning to step 336, if a dependency violation is detected, or if a stop request is received, the process proceeds to step 342, FIG. 3(c) where the thread stops the next speculative thread—which is the same threads it started at step 332. Then, all data with a "modified" bit set in cache L1 and cache L1.5 registers is discarded at step 344, and the thread stops its execution at step 362.

Figure 3D:
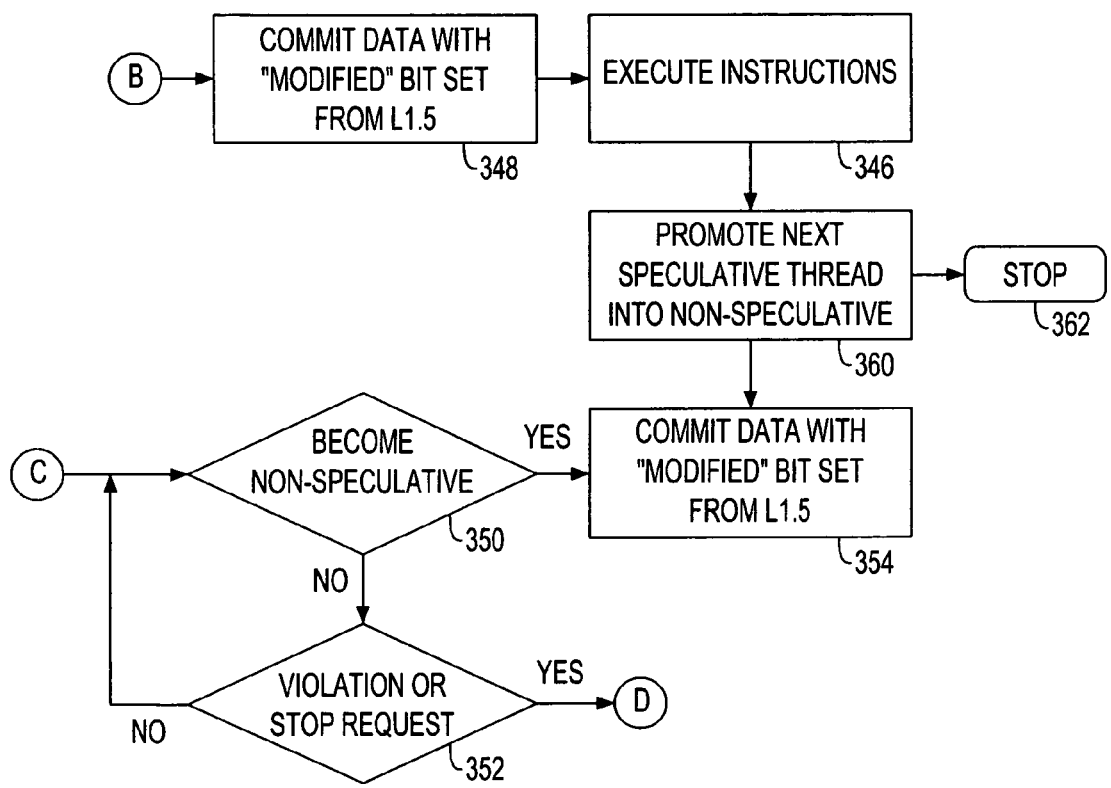

Returning to step 338, if the condition is detected that this speculative thread has become the non-speculative thread, the process proceeds to step 348, FIG. 3(d) where the thread first commits all data from the cache L1.5 with the "modified" bit set (348). Then, the thread continues to execute instructions at step 346. Once becoming the non-speculative thread and committing the modified data from the L1.5 cache, the cache L1.5 is basically not used anymore, as all results are committed directly to L2 and hierarchically lower memory levels. After data executing all instructions, it promotes the next speculative thread into the non-speculative thread as indicated at step 360 which is the same thread it started at step 332. Finally, the thread stops its execution at step 362, FIG. 3(d).

Returning to step 340, if it is determined that a speculative thread has reached the end of its instruction stream, it can not commit the data until it becomes the non-speculative thread. For this reason, it enters a wait state as indicated at step 350, FIG. 3(d), where it stays until either it becomes a non-speculative thread (as determined at step 350) or, until a dependency violation is detected or a stop request is received which condition is checked at step 352. If, at step 350, it is determined that the thread becomes the non-speculative thread, it commits the data from the L1.5 cache with "modified" bit set as indicated at step 354, and, promotes the next speculative thread into the non-speculative thread at step 360, and stops its execution in the step 362. Returning to step 352, if it is determined that a violation or a stop request has been received, the process proceeds to step 342, FIG. 3(c) where the thread stops the next speculative thread—which is the same threads it started at step 332. Then, all data with a "modified" bit set in cache L1 and cache L1.5 registers is discarded at step 344, and the thread stops its execution at step 362.

Figure 4:
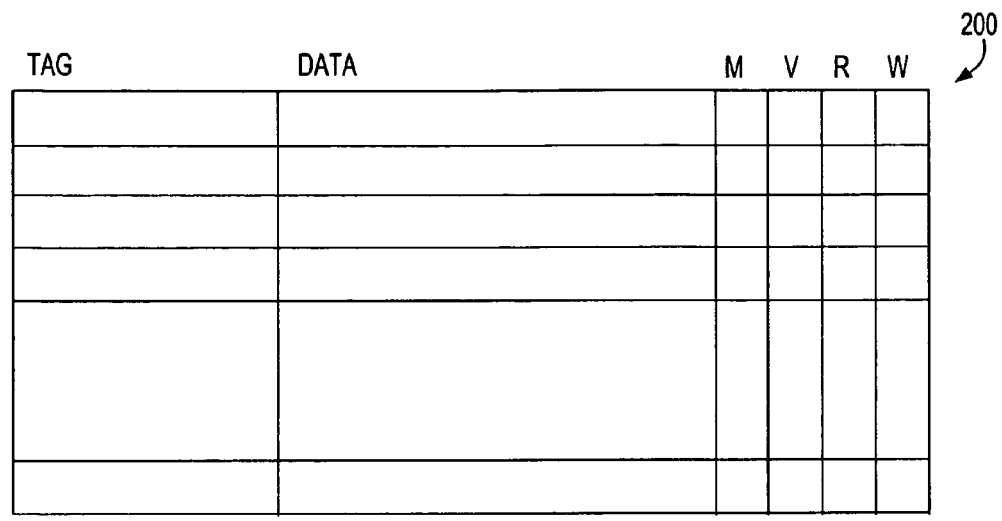
FIG. 4 illustrates the structure of the L1.5 cache according to the present invention.

FIG. 4 illustrates the structure of the L1.5 cache 200 according to the present invention. This cache comprises a number of cache lines with each line including an address tag field, a data field, and several special status bit fields, including a "modified" bit field (M) and a "valid" bit field (V). In addition to these fields typically found in every cache, there is assigned several more bits or bit groups to each line to keep record if a cache line was read, e.g., as indicated in a "read" bit field (R) or if a cache line was written to, e.g., as indicated in a "write" bit field by a thread.

Figure 5:
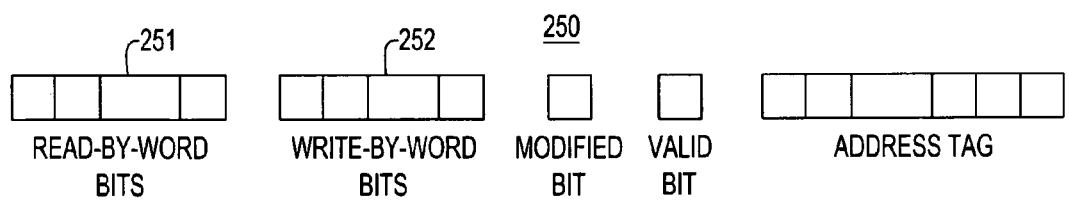
FIG. 5 illustrates the structure of the tag field for the L1.5 cache.

FIG. 5 is a detailed depiction of the tag field and status bits 250 of the L1.5 cache 200 in the preferred embodiment. In addition to the address tag, and "valid" and "modified" bits, which are typically present in any cache, the status bits tag also includes a set of "read-by-word" bits 251 and a set of "write-by-word" bits 252. One bit is present for each word, byte, double word, or any other desired granularity. Alternatively, only one bit can be used for the whole cache line. If a data word from the cache line is read by this thread, the corresponding bit in the "read-by-word" is set. Accordingly, the corresponding "write-by-word" bit is set if a word gets written by the thread. The information included in "read-by-word" bits (i.e., information if a word is read by the thread) is used to detect a Read-After-Write (RAW) dependency violation. The RAW violation occurs if a less speculative thread writes to an address that a more speculative thread has already read. In this case, the read occurred too early and the more speculative thread has used invalid data, i.e., the more speculative thread reads data before the less speculative thread had written data. This event is labeled a RAW violation. Information included in "write-by-word" bits (i.e., information if a word is written by the thread) is used to detect a Write-After-Write (WAW) dependency violation. The WAW violation occurs if a less speculative thread writes to an address that a more speculative thread has already written. The WAW violation does not cause stopping of the speculative thread and all subsequent (more speculative) threads, but it has to be detected to prevent overwriting of the results of the more speculative thread with results of the less speculative thread.

A "Valid" bit is set if a cache line contains valid data, and a "modified" bit is set if data from this cache line were written by the thread. In addition to this operation—which is the same as for the regular cache—the "modified" bit is also set if data are read by the thread having speculative status. This is to distinguish between speculative from non-speculative data—which is needed to know when removing speculative data from the cache L1.5 and L1 if a thread is stopped—as speculative data from less speculative threads could be forwarded to this cache on a load operation, as now described herein with respect to FIG. 6.

Figure 6:
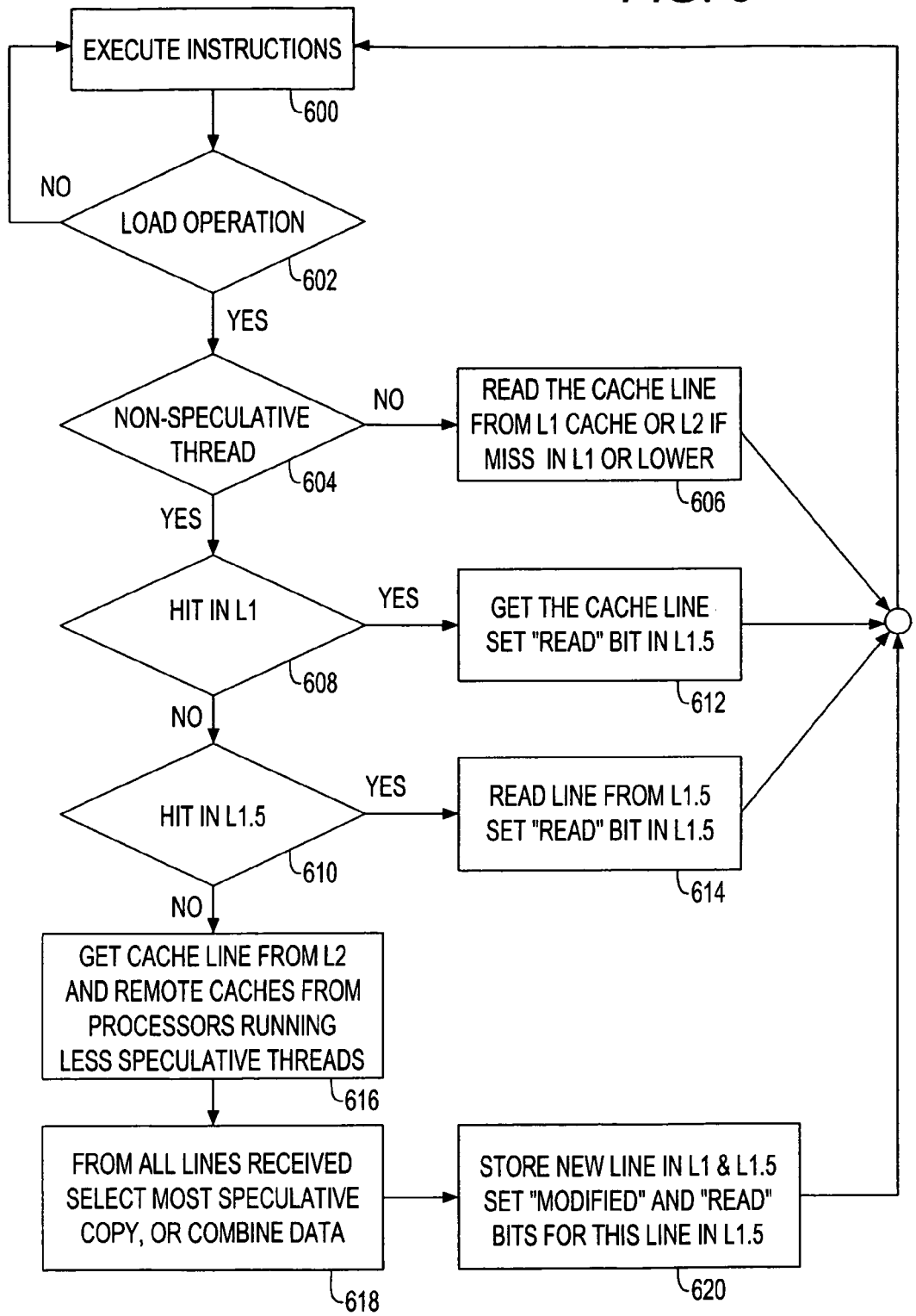
FIG. 6 illustrates a flow chart depicting a sequence of operations conducted for a load operation.

FIG. 6 illustrates sequence of operations on a load operation. If a load operation is detected as indicated at step 602, execution differs for non-speculative and speculative threads. Thus, for example, if the executed instruction is to perform a load operation, the process proceeds to step 604 to determine whether the requesting thread is a speculative thread. If at step 604, it is determined that the thread is a non-speculative thread, the process proceeds to step 606 where the operation does not differ from the typical sequence of operation, i.e., data are fetched from the L1 cache or from L2 cache if there is a L1 cache request miss, and if L2 request also misses, data are read from the L3, or from the main memory. After performing the read for the non-speculative thread, the process subsequently returns to execute the next instruction at step 600. Once the line is fetched, both the L1 and L1.5 caches get the new cache line. If at step 604, it is determined that the thread is a speculative thread, the process proceeds to step 608 where the L1 cache is first checked for the request. If the word is located in the L1 cache, the cache line data are fetched and the "read" bit for the corresponding line in L1.5 is set as indicated at step 612, and the thread continues its execution by returning to step 600. If, at step 608, it is determined that the read request misses in L1 cache, the process proceeds to step 610 where a determination is made whether the line is contained at the L1.5 cache level. On a hit in L1.5, the data are read as indicated at step 614 and the "read" bit for this line is set, and data are sent to the processor for continuing execution. The process subsequently returns to execute the next instruction at step 600. If at step 610, it is determined that there is a miss in the L1.5 cache, then the process continues to step 616 where the thread gets a copy from the L2 cache (or from the L3 cache or main memory if L2 cache misses) and speculative copies from remote caches from processors running less speculative threads than the requesting thread. Then, as indicated at step 618, the copies from speculative threads and from the L2 cache may be combined data byte-by-byte (or word-by-word), with the most speculative thread having the highest and L2 cache the lowest priority. More simply, the copy from the most speculative thread is used as indicated at step 618. Other selection schemes can be used for selecting the propped data without departing from the scope of this invention. Proceeding next to step 620, the new cache line has its "modified" bit set, and both the L1 and L1.5 caches get the new cache line prior to returning to step 600. This scheme implements data forwarding from less speculative threads to more speculative threads. Thus, when a more speculative thread needs data and misses in the L1 cache, it will get the most recent data from less speculative thread, thus reducing the probability of using the stale non-speculative data from the memory. However, if the thread is stopped at some point in time, than this cache line may contain speculative data and has to be removed from the cache.

Figure 7:
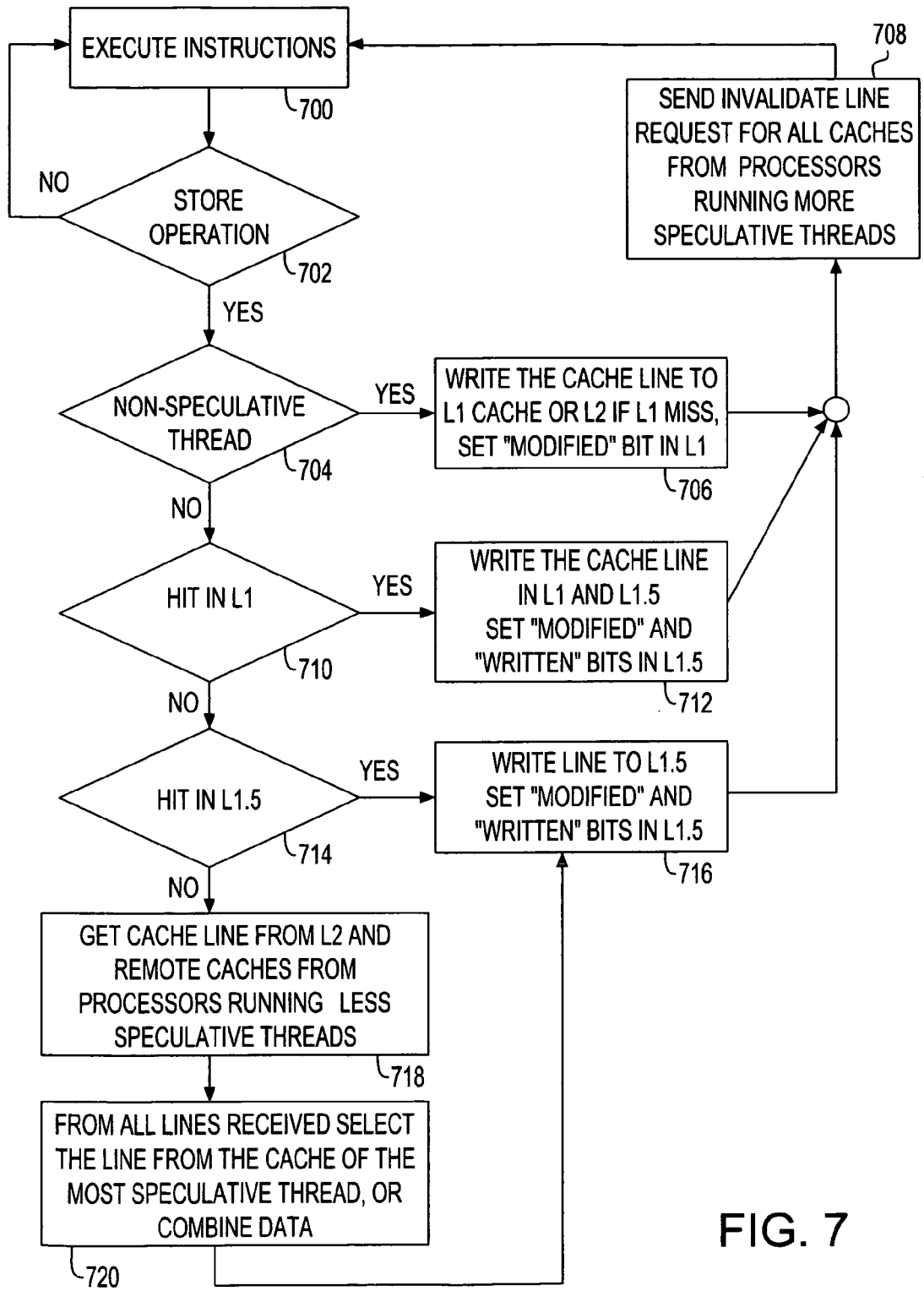
FIG. 7 illustrates a flow chart depicting a sequence of operations conducted for a store operation; and, FIG. 8 illustrates a flow chart depicting the control flow for detecting true dependency violations according to the invention.

FIG. 7 illustrates the sequence of operations performed on a store operation. As shown at step 702, a determination is made as to whether the current instruction to be executed is a store operation. If a store operation is detected in the step 702, the process proceeds to step 704 where a determination is made as to whether the store execution is for a speculative versus non-speculative thread as the process differs for non-speculative and speculative threads. If the current store operation is for a non-speculative thread, then the process proceeds to step 706 where the non-speculative data can be written to the L1 cache, or to the L2 cache if L1 cache misses, and to the hierarchically lower memory levels 706. If the cache line is located in the L1 or L2 cache, data are written, and the "modified" bit is set. Afterward the process proceeds to step 708 where an invalidate request for this address is sent to all processors running more speculative threads, and the thread continues execution of the next instruction as shown at step 700. Returning to step 704, if it is determined that the store operation is for a speculative thread, the process proceeds to step 710 where a determination is made as to whether the word is found in the L1 cache level. If the word is located in the L1 cache (a L1 cache hit), then the process proceeds to step 712 where the data are written to L1 cache line and, in parallel, is written to the L1.5 cache line as indicated at step 712 and the bits "written" and "modified" are set at those cache lines. Afterward, the process proceeds to step 708 where the invalidate request for this address is sent to all processors running more speculative threads, and the thread continues its execution. Otherwise, returning to step 710, if it is determined that the write request misses the L1 cache, the process proceeds to step 714 where a determination is made as to whether there is a hit, i.e., the line is included in the L1.5 cache. On a hit in L1.5, the data are written to the L1.5 cache and bits "written" and "modified" are set as indicated at step 716. Then, proceeding to step 708, the invalidate request for this address is sent to all processors running more speculative threads, and the thread continues its execution. Returning to step 714, on a miss in L1.5 cache, the process proceeds to step 718 where the speculative thread gets a copy from the L2 cache (or from the L3 cache or main memory if L2 misses), and receives speculative copies from remote caches from processors running less speculative threads than the requesting thread. These copies from speculative threads and from L2 cache can be combined data byte-by-byte (or word-by-word), with the most speculative thread having the highest priority and L2 cache the lowest priority, or simply the copy from the most speculative thread is used as indicated at step 720. Other selection schemes can be used for selecting the propped data without departing from the scope of this invention. Next, the process proceeds to step 716 where the data line is written to the L1.5 cache and bits "written" and "modified" are set. If the L1 cache has been configured in the "write-through with allocate on store" mode, then this data line is stored in the L1 cache with the "modified" bit set as well.

Figure 8:
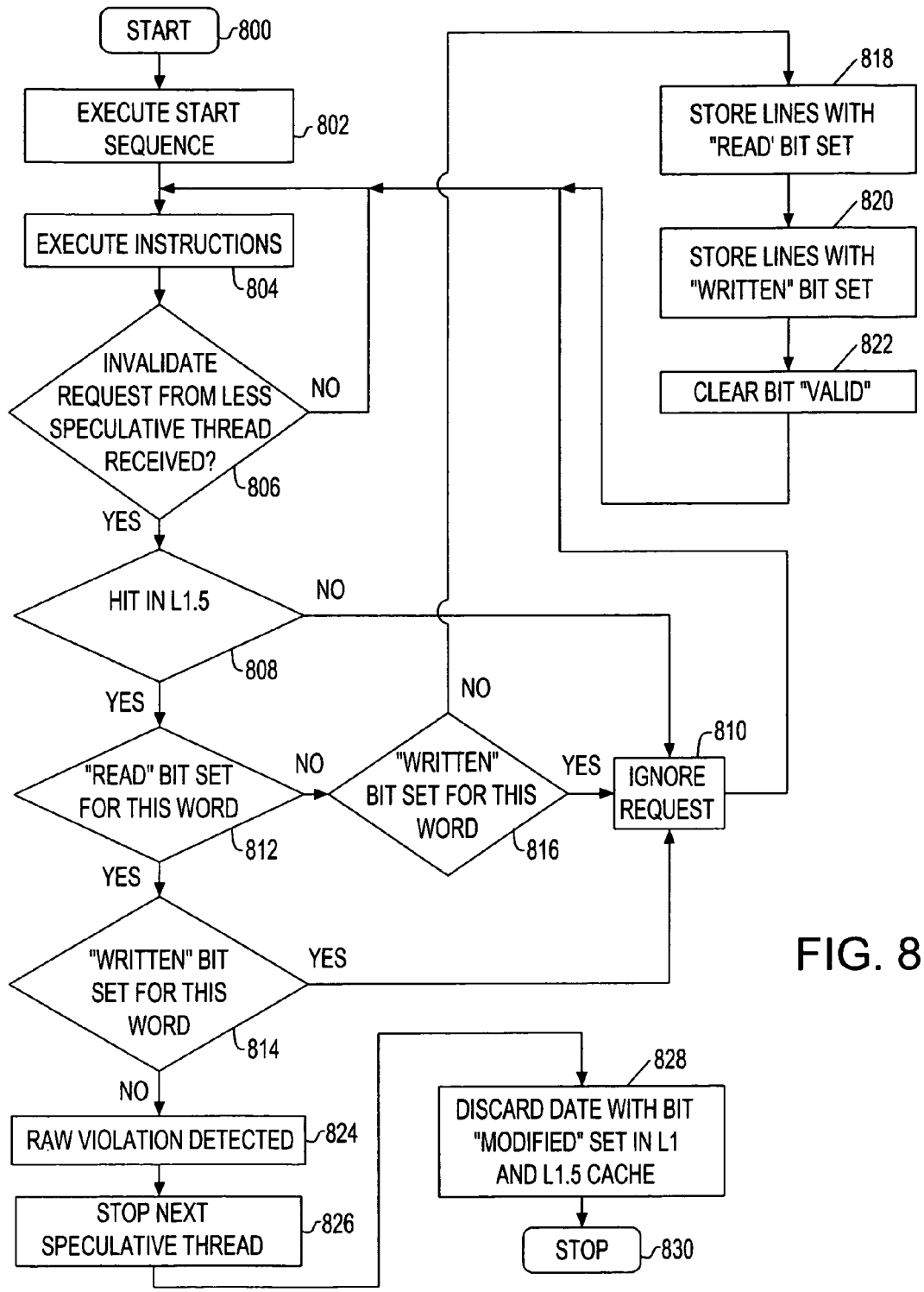

FIG. 8 illustrates a flow chart depicting the control flow 800 for detecting true dependency violations according to the invention. After the speculative thread has been started and a start sequence executed at step 802 (in the manner as described herein with respect to FIG. 3(b)), the thread executes an instruction sequence as indicated at step 804. With respect to an executing instruction, a determination is made at step 806 as to whether an invalidate request from the remote cache has been received from less speculative thread. If no remote cache invalidate request from the remote processor running a less speculative thread is received at step 806, the thread continues its execution at step 804. If however, at step 806, a write request from a remote cache having a processor running a less speculative thread is received, the request has to be checked to determine if this cache line hits in the L1.5 cache as determined at step 808. If the remote cache request misses in the L1.5 cache, this request is ignored as indicated at step 810, and the thread continues its normal execution at step 804. If, on the other hand, the remote cache request has hit in the L1.5 cache, a determination is made at step 812 as to whether the "read" bit has been set for that cache line, or whether a corresponding "read-by-word" bit of set 251 (see FIG. 5) has been set. If, at step 812, it is determined that this read bit is not set for this particular word, this means that this word was not read by the local thread, so no RAW violation has happened. Thus, the line has to be evicted from the L1.5 cache, unless it has already been written to by the local thread. Thus, the process proceeds to step 816 where a determination is made as to whether a "written" bit has been set for this cache line/word to avoid a WAW dependency violation. If the corresponding "write-by-word" bit of this cache line has been set, this means that the local, more speculative thread has already written results to this line. The control flow in this case returns to step 810, where the remote cache invalidate request is ignored, and the process continues to the instruction execution at the step 804. If however, the proper "write-by-word" bit had not been set, this cache line has to be evicted. However, it is the case that before a line in the L1.5 cache can be evicted, all addresses from the line with "read-by-word" bits have to be stored. Thus, continuing from step 816, the process proceeds to step 818 where the "read" addresses are stored. This is because all reads from a speculative thread have to be remembered, to be able to detect RAW dependency violation. To accomplish this, several approaches are possible. One approach is not to allow line eviction and to stall the processor until it either becomes the non-speculative thread, when it continues normal execution (as no RAW violations were detected), or until the local speculative thread gets a stop request from the less speculative thread. Another possible solution is to add a victim buffer where address read by the local thread from the evicted cache lines is stored until the thread is either stopped or it gets promoted into the non-speculative thread. Other approaches are also possible without departing from the scope of this invention. Similarly, if any "write-by-word" bit is associated with this cache line (other than from the address of the remote cache request), the address and the modified data can not be discarded. Thus, the local thread is either stalled until it gets non-speculative or, is stopped, or addresses and modified data for from those fields with the "written" bits set are stored in a store buffer as indicated at step 820. After this, the cache line is invalidated in the step 822, e.g., by setting the cache line's "valid" bit to zero (0), and the local thread continues its execution at step 804. It should be understood that by not using "read-by-word" bit granularity but rather, only one "read" bit per cache line, the same remote cache request could result in stopping the local thread, even if the remote processor wrote to the different word from the word read by the local processor for both words located in the same cache line.

Returning to the step 812, FIG. 8, if it is determined that the "read" bit has been set for this word, then the process proceeds to next step 814, where a determination is made as to whether the "written" bit has been set for the cache line to avoid WAW dependency violation. If the corresponding "write-by-word" bit of this cache line has been set, this means that the local, more speculative thread has already written results to this line. Thus, if "write-by-word" bit has been set, then the control flow proceeds to step 810 where the remote cache invalidate request is ignored, and the process continues with the instruction execution at step 804. If, the corresponding "read-by-word" bit is set (at step 812) and the proper "write-by-word" bit is not set (as determined at step 814), then a RAW violation is detected as indicated at step 824. A stop request is then sent to the next speculative thread to stop more speculative threads as indicated at step 826, and modified data from L1 and L1.5 caches are discarded as indicated at step 828. Finally, at step 830, the speculative thread stops its execution.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. An apparatus for supporting thread level speculative execution in a computing environment having multiple processing units adapted for concurrent execution of threads in speculative and non-speculative modes, each processing unit having first and second level caches operatively connected therewith for enabling multiprocessing, the apparatus comprising:

an additional cache level local at each said processing unit for use only in a thread level speculation mode, each said additional cache for storing speculative results and status associated with its associated processor when handling speculative threads;

means for interconnecting each said additional cache level for forwarding speculative values and control data between parallel executing threads; and means for bypassing said additional cache level when no speculation processing thread is enabled at an associated processing unit.

2. The apparatus as claimed in claim 1, wherein said additional local cache is hierarchically positioned between said first and second level caches.

3. The apparatus as claimed in claim 1, wherein said additional local cache is hierarchically positioned between said second level cache and a third level cache.

4. The apparatus as claimed in claim 1, wherein said means for interconnecting said additional local cache level comprises a bus.

5. The apparatus as claimed in claim 1, wherein said means for interconnecting said additional local cache level comprises a crossbar switch.

6. The apparatus as claimed in claim 1, wherein for said speculative mode, cache coherency in a first level cache is replaced by coherency in said additional cache.

7. The apparatus as claimed in claim 1, further comprising:
means for enabling communication of data between said additional cache level and said first level cache; and
means for enabling communication of data between said additional cache level and said second level cache, said bypass means enabling communication directly between said first and second level caches.

8. The apparatus as claimed in claim 1, wherein said means for enabling communication of data between said additional cache level and said second level cache includes a multiplexer device, said bypassing means comprising means for selecting the multiplexer device to either feed data to and from the additional cache in the thread level speculation mode, or to completely bypass the additional cache in a multiprocessing mode where no speculation is enabled.

9. The apparatus as claimed in claim 1, wherein said means for selecting the multiplexer device is responsive to a generated instruction.

10. The apparatus as claimed in claim 1, wherein said means for selecting the multiplexer device is responsive to a bit location in a memory storage register.

11. A method for supporting thread level speculative execution in a computing environment having multiple processing units adapted for concurrent execution of threads in speculative and non-speculative modes, each processing unit having first and second level caches operatively connected therewith for enabling multiprocessing, the method comprising providing an additional local cache level at each said processing unit for use only in a thread level speculation mode, each said additional cache for storing speculative results and status associated with its associated processor when handling speculative threads.

12. The method of claim 11, wherein said additional local cache level is hierarchically positioned between said first and second level caches.

13. The method of claim 11, further comprising:
tracking cache lines written to said additional local cache level at a processing unit executing speculative threads as being of modified status;
determining promotion of said executing speculative thread to non-speculative mode, and, in response,
committing all data from the additional local cache level having said modified status directly to second level and hierarchically lower memory levels.

14. The method of claim 13, wherein after determining promotion of an executing speculative thread to non-speculative mode, the step of promoting a successive processing unit operating in speculative mode to operate in a non-speculative mode.

15. The method of claim 13, further comprising:
detecting while executing speculative threads at a processing unit, whether there is a dependency violation, said dependency violation including a Read-After-Write (RAW) dependency violation that occurs if a less speculative thread writes to an address that a more speculative thread has already read.

16. The method of claim 15, further comprising:
detecting while executing speculative threads at a processing unit, whether there is a dependency violation, said dependency violation including a Write-After-Write (WAW) dependency violation that occurs if a less speculative thread writes to an address that a more speculative thread has already written to, said method thereby preventing overwriting of results of a more speculative thread with results of a less speculative thread.

17. The method of claim 13, further comprising:
detecting, while executing speculative threads at a processing unit, whether a stop request is received, and in response to receipt of a stop request:
stopping a next successive speculative thread; and,
discarding all data from the additional local cache level having said modified status.

18. The method of claim 16, further comprising:
providing a cache line of said additional local cache level with one or more "read-by-word" bits, a bit of said one or more "read-by-word" bits is associated with a word, byte, double word, or other granularity of data in said cache line, and,
setting corresponding one or more "read-by-word" bits when data from the cache line is read by a speculative thread, said "read-by-word" bits being utilized in the detection of said RAW dependency violation.

19. The method of claim 18, further comprising:
providing a cache line of said additional local cache level one or more "write-by-word" bits, a bit of said one or more "write-by-word" bits is associated with a word, byte, double word, or other granularity of data in said cache line; and,
setting corresponding one or more "write-by-word" bits when data is written to the cache line by a speculative thread, said "write-by-word" bits being utilized in the detection of said WAW dependency violation.

20. The method of claim 11, comprising steps for performing a cache load operation, said method further comprising:
determining whether the requesting thread is a speculative thread and if the requesting thread is a speculative thread, reading data from a requested cache line from one of: a processing unit's first cache level or, a from the processing unit's associated additional cache level, and setting a read flag therein.

21. The method of claim 20, comprising detecting a cache miss in said first cache level or, said associated additional cache level and in response to said detecting:
obtaining a cache line from remote caches associated with one or more processing units running less speculative threads and, selecting data from a processing unit for storage in the first level and additional cache levels; and,
setting a modified flag and read flags for this stored cache line in said additional cache level.

22. The method of claim 21, wherein said selected data to be loaded includes data from a most speculative thread of processing units running said less speculative threads.

23. The method of claim 19, comprising steps for performing a cache store operation, said method further comprising:
determining whether the requesting thread is a speculative thread and if the requesting thread is a speculative thread, writing a requested cache line data to one of: a processing unit's first cache level, a processing unit's associated additional cache level, or both;
setting a modified flag and written flag in said associated additional cache level; and, sending an invalidate line request for all caches from remote processing units running more speculative threads.

24. The method of claim 23, comprising detecting a cache miss in said first cache level or, said associated additional cache level and in response to said detecting:
   obtaining a cache line from remote caches associated with one or more processors running less speculative threads than the current thread and selecting data from a processing unit cache to be written to said additional cache level;
   setting said modified flag and written flag for this line in said additional cache level corresponding to said written cache line; and,
   sending an invalidate line request for all caches from remote processing units running more speculative threads.

25. The method of claim 24, wherein said selected data to be stored includes data from a cache associated with the most speculative thread of said one or more processors running less speculative threads.

26. The method of claim 24, wherein a processing unit in speculative thread mode executes instruction sequences, wherein in response to an invalidate request for a cache address received from a less speculative thread, the steps of:
   determining whether the requested cache line hits in the additional cache of said remote processor;
   if the cache lines request hits an additional cache level of said remote processing unit, determining whether a "read-by-word" bit has been set for that cache line, or whether the "write-by-word" bit has been set for that cache line;
   detecting a RAW dependency violation when said "read-by-word" bit has been set for that cache line and said "write-by-word" bit has not been set;
   stopping a next successive speculative thread; and,
   discarding all data from the additional local cache level having said modified status.

27. The method of claim 24, wherein a processing unit in speculative thread mode executes instruction sequences, wherein in response to an invalidate request for a cache address received from a less speculative thread, the steps of:
   determining whether the requested cache line hits in the additional cache of said remote processor;
   if the cache lines request hits an additional cache level of said remote processing unit, determining whether a "read-by-word" bit has been set for that cache line, or whether the "write-by-word" bit has been set for that cache line;
   detecting a WAW dependency violation when said "read-by-word" bit has not been set for that cache line and said "write-by-word" bit has been set.

28. The method of claim 27, wherein when said "read-by-word" bit has not been set for that additional cache level cache line and said "write-by-word" bit has not been set, the steps of:
   storing all addresses from said cache line having corresponding "read-by-word" bits set;
   storing all addresses from said cache line having corresponding "write-by-word" bits set; and,
   invalidating said cache line.

29. The method of claim 11, further comprising switching a processing unit between speculative thread and non-speculative thread execution modes, wherein upon switching a processing unit to a non-speculative thread mode, the step of bypassing said additional local cache level at a corresponding processing unit when storing data to and retrieving data from an associated first cache or second cache level.

30. A program storage device readable by a machine, tangibly embodying a program of instructions executable by the machine to perform method steps for supporting thread level speculative execution in a computing environment having multiple processing units adapted for concurrent execution of threads in speculative and non-speculative modes, each processing unit having first and second level caches operatively connected therewith for enabling multi-processing, the method steps comprising: providing an additional local cache level at each said processing unit for use only in a thread level speculation mode, each said additional cache for storing speculative results and status associated with its associated processor when handling speculative threads.

31. The program storage device readable by a machine as claimed in claim 30, wherein said additional local cache level is hierarchically positioned between said first and second level caches.

32. The program storage device readable by a machine as claimed in claim 30, further comprising steps of:
   tracking cache lines written to said additional local cache level at a processing unit executing speculative threads as being of modified status;
   determining promotion of said executing speculative thread to non-speculative mode, and, in response,
   committing all data from the additional local cache level having said modified status directly to second level and hierarchically lower memory levels.

33. The program storage device readable by a machine as claimed in claim 32, wherein after determining promotion of an executing speculative thread to non-speculative mode, the step of promoting a successive processing unit operating in speculative mode to operate in a non-speculative mode.

34. The program storage device readable by a machine as claimed in claim 32, further comprising:
   detecting while executing speculative threads at a processing unit, whether there is a dependency violation, said dependency violation including a Read-After-Write (RAW) dependency violation that occurs if a less speculative thread writes to an address that a more speculative thread has already read.

35. The program storage device readable by a machine as claimed in claim 33, further comprising:
   detecting while executing speculative threads at a processing unit, whether there is a dependency violation, said dependency violation including a Write-After-Write (WAW) dependency violation that occurs if a less speculative thread writes to an address that a more speculative thread has already written to, said method thereby preventing overwriting of results of a more speculative thread with results of a less speculative thread.

* * * * *